United States Patent Office 2,917,468
Patented Dec. 15, 1959

2,917,468

SURFACE ACTIVE POLYMERIC TRIMETHYLENE OXIDE DERIVATIVES WITH POLYETHER SIDE-CHAINS, AND PROCESS FOR PRODUCING SAME

Hermann Schnell, Krefeld-Urdingen, Joachim Nentwig, Krefeld, Karl Hintzmann, Leverkusen, Karl Raichle, Krefeld-Urdingen, and Wolfgang Biedermann, Krefeld, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware No Drawing. Application March 21, 1956
Serial No. 572,840

3 Claims. (Cl. 260—2)

The present invention comprises polymeric trimethylene oxide derivatives having polyether side chains, and their application. The new polymeric trimethylene oxide derivatives according to the invention have the general formula:

(I)
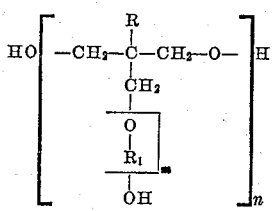

wherein R represents an alkyl residue or the hydroxy methyl or the hydroxy ethyl group, $R_1$ the ethylene or/and the propylene group, and $m$ and $n$ a whole number greater than 1. $m$ may have for instance a value from 1 to about 100 and $n$ a value from 1 to about 30. Such products wherein $m$ represents a number from about 3 to about 30 and $n$ a number from about 3 to about 10 are preferred.

Among the alkyl residues according to the Formula I there may be mentioned for instance: the methyl, the ethyl, the propyl, the isopropyl, the butyl, the isobutyl, the amyl, the isoamyl, the hexyl, the isohexyl, the heptyl, the isoheptyl, the octyl, the isooctyl, the nonyl, the isononyl, the decyl, the isodecyl, the undecyl, the isoundecyl, the dodecyl, the isododecyl group, and all other alkyl groups up to about 30 carbon atoms in unbranched or branched chains.

In our application Ser. No. 502,506 and in the copending continuation in part application Ser. No. 540,352 there is described a process for the manufacture of trimethylene oxide compounds containing hydroxyl groups which comprises reacting a polyhydroxy compound of the general formula:

(II)
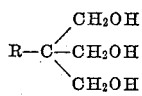

wherein R stands for the methyl, the ethyl or the hydroxy-methyl group, with a carbonic acid derivative of the general formula:

(III)

wherein X stands for a halogen atom or a radical of a hydroxy alkyl, cycloalkyl or aryl compound or X—X for a radical of a dihydroxy alkyl, cycloalkyl or aryl compound the corresponding hydroxy compounds of which having a boiling point of at most 160° C./0.1 mms. mercury gauge. The products of that process have the general formula:

(IV)
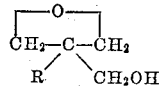

wherein R is an alkyl or a hydroxyalkyl group.

Typical representatives of such trimethylene oxide alcohols are for example: the 3-methyl-3-methylol-trimethylene oxide, the 3-ethyl-3-methylol-trimethylene oxide, the 3-propyl-3-methylol-trimethylene oxide, the 3,3-dimethylol-trimethylene oxide and the 3-ethylol-3-methylol-trimethylene oxide.

It has now been found, that new technically interesting aliphatic polyethers can be obtained by polymerising trimethylene oxide alcohols mentioned above (corresponding to the Formula IV) which may be manufactured corresponding to the process mentioned above wherein R represents an alkyl residue or the hydroxy methyl or the hydroxy ethyl group corresponding to Formula I, and then modifying the polymerisates by reaction with alkylene oxides selected from the group consisting of ethylene oxide and propylene oxide.

Polymerisation of the trimethylene oxide alcohols, involving opening the ether ring, is achieved with the aid of acid catalysts. There are suitable for this purpose for example hypochlorous acid, sulphuric acid, phosphoric acid, cation exchangers such as the resin obtained by sulphonating a styrene-divinyl benzene mixed polymer; furthermore catalysts of the Friedel-Crafts type such as aluminum chloride, tin tetrachloride, antimony pentachloride, zinc chloride and boron trifluoride. There can also be used with advantage the known catalysts and catalyst combinations for polymerising tetra hydrofurane. The quantity of catalyst to be added ranges from 0.01 to 10 mol percent, for example, and depends upon their catalytic activity.

The polymerisation can be carried out within a wide range of temperatures. Thus one can commence for example at room temperature and continue the reaction under its own heat. In some cases it is also an advantage to polymerise at lower temperatures. By adding an indifferent diluent the duration of the reaction can be controlled. A diluent boiling under reflux can also be used to conduct away the heat released, whereby particular polymerisation temperatures can be maintained. When a diluent is used the polymerisate generally separates out since in contrast to the monomer it is insoluble in most solvents.

After completion of the polymerisation the catalyst is neutralised, if necessary, by treating the polymerisate with bases such as ammonia, alkali metal or alkaline earth metal hydroxides or carbonates or organic bases such as methylamine or pyridine. If the neutralising agent and its reaction product with the catalyst are water soluble the polymerisate may be freed therefrom by washing with water. Insoluble materials are removed by filtering preferably in the warm and if necessary with added solvent.

The polymerisation products of the trimethylene oxide alcohols themselves are fairly high molecular, generally glass clear, hard resins which are surprisingly insoluble in most usual solvents such as water, alcohols, ketones, esters and hydrocarbons. Only a few high boiling solvents, for example dimethyl formamide, glycolmonomethyl ether, cyclohexanone and monomeric trimethylene oxide alcohols, possess a certain solvent capacity but only at elevated temperatures. Good solubility is only found in a few strongly polar solvents, e.g. pyridine, di- and triethanolamine and cresol.

According to the invention the polymerisation products obtained in the described manner finally are modified, as mentioned above, by the introduction of high molecular ether side chains. This may be done by reaction of the hydroxyl groups with ethylene oxide or propylene oxide. For this purpose the polymeric trimethylene oxides may be melted and, under addition of a catalyst such as an alkali metal, e.g. sodium, or other basic agents such as alkali metal hydroxides, for instance sodium hydroxide, and tertiary amines, ethylene oxide or propylene oxide is introduced. This reaction, in general, takes place at a temperature range of about 50 to 250° C. and particularly of about 80 to 200° C. The use of elevated pressure is not necessary. Usually atmospheric pressure is sufficient. In some cases, however, it may be advantageous to raise the pressure for instance up to 10-20 atmospheres. The amount of the introduced alkylene oxide determines the number and the length of the polymeric ether side chains in the final products.

It has furthermore been found that the polymeric derivatives of trimethylene oxide can also be produced in another technically advantageous manner and in a rapid and a smooth reaction when they are based on monomeric trimethylene oxide derivatives already having polyether side chains.

This process for producing the desired trimethylene oxide derivatives with polyether side chains consists in reacting upon trimethylene oxide alcohols mentioned above, for example, 3-ethyl-3-methylol trimethylene oxide or 3,3-dimethylol trimethylene oxide, in a manner known per se for alcohols, an alkylene oxide, for example ethylene or propylene oxide.

The monomeric trimethylene oxide derivative thus produced is then polymerised in the presence of Friedel-Crafts catalysts, such as aluminium chloride, zinc tetrachloride, boron trifluoride, if desired in the form of addition compounds with e.g. ether, acetic ester or other organic solvents.

The polymerisation proceeds even at room temperature preferably at only slightly elevated temperatures, for example at about 100°, with considerable speed. The polymerisation can be carried out in bulk or in solution.

It is also possible to produce mixed polymers from different hydroxy alkylated trimethylene oxide derivatives and similarly one can interpolymerise hydroxyalkylated trimethylene oxide derivatives with other trimethylene oxide derivatives.

The polymeric trimethylene oxide derivatives with polyether side chains obtained according to the invention are liquid, highly viscous, paste-like or wax-like compounds, which are more or less readily water-soluble and which distinguish themselves by a number of technically useful properties, particularly by an outstanding dissolving power, good adhesion on surfaces of materials, a satisfactory film-forming capacity and an antistatic effect combined with a marked surface activity.

The properties of the trimethylene oxide derivatives and their special suitability for the one or other purpose depend to a great extent on the length of the ether side chains and on the kind of substituents present.

The products are applied as wetting, emulsifying, dispersing or cleansing agents and as additives for pharmaceutical and cosmetic preparations, e.g. salves. Especially they are very useful as levelling agents, particularly as auxiliaries in textile and paper-dyeing.

The following examples are given for the purpose of illustrating the invention, the parts denoting parts by weight unless otherwise stated.

*Example 1*

100 parts of 3-ethyl-3-methylol trimethylene oxide are combined with stirring with 0.15 part by volume of 60% hypochlorous acid. In about 40 minutes the reaction mixture temperature rises to about 60° C. and solidifies to a clear transparent mass. This is allowed to remain for 20 hours at the given temperature and finally treated at about 140° C. with gaseous ammonia and with stirring to neutralise the catalyst. By distilling under reduced pressure with the temperature maintained at 140° C. the volatile parts are separated. 92 parts of a colourless hard resin are obtained with a softening point of 117° C. measured according to the quicksilver method of Kramer-Sarnow. The relative viscosity is 1.07 measured at 20° C. in 0.5% cresol solution; the hydroxyl number is 505.

To 92 parts of this resin 0.46 part of sodium is added. Then the air is displaced by nitrogen, the mixture heated to 160° C., and 350 parts of ethylene oxide are introduced. Within a short time they are completely absorbed. After cooling the mass to room temperature 440 parts of a waxy, yellowish paste are obtained. It is the polymeric trimethylene oxide with polyether side chains which contains about 10 mols of ethylene oxide per one hydroxyl group of the origin resin.

Instead of 350 parts of ethylene oxide in this example the equivalent amount of propylene oxide may also be used in a corresponding manner. Further it is also possible to use only a part, for instance 200 parts, of ethylene oxide and, before or after this treating, a second part, for instance also 200 parts, of propylene oxide in a corresponding manner.

The properties of the products depend, as described above, in a wide range on the amount of the mols of alkylene oxide pro hydroxyl group of the polymeric trimethylene oxide. The following table shows the change of the relative viscosity of the products measured in a 0.5 percent solution in cresol at 25° C. in the "Ubbelohde-Viskosimeter" and of the hydroxyl number of products obtainable according to the process as described above, wherein the number of mols of ethylene oxide pro hydroxyl group grows from 1.44 to 83.0.

| Mols ethylene oxide pro hydroxyl group | relative viscosity | hydroxyl number |
|---|---|---|
| 1.44 | 1.052 | 360 |
| 2.73 | 1.046 | 261 |
| 3.66 | 1.053 | 243 |
| 4.53 | 1.054 | 216 |
| 5.93 | 1.069 | 180 |
| 7.25 | 1.061 | 156 |
| 8.45 | 1.061 | 134 |
| 11.6 | 1.075 | 120 |
| 13.05 | 1.081 | 110 |
| 15.7 | 1.091 | 96 |
| 17.5 | 1.096 | 78 |
| 23.6 | 1.093 | 85 |
| 30.5 | 1.115 | 59 |
| 41.0 | 1.132 | 49 |
| 52.1 | 1.148 | 42 |
| 67.8 | 1.153 | 56 |
| 83.0 | 1.192 | 41 |

The products with a relatively low amount of ethylene oxide (1-5 mols ethylene oxide pro hydroxyl group) are viscous liquids, the compounds with a middle amount of ethylene oxide (5-15 mols pro hydroxyl group) are semisolid pastes. Compounds with more than about 15 moles ethylene oxide pro hydroxyl group are waxy and melt at about 45° C.

The substances are yellowish to yellow-brown. If desired they may be blanched by a short treatment with hydrogen peroxide.

The products with an ethylene oxide component up to about 5 mols pro hydroxyl group are in general more or less difficultly soluble in water. The compounds with greater amounts of ethylene oxide however are highly soluble in water as well as in a great number of organic solvents, excepted in aliphatic hydrocarbons.

The polymeric trimethylene oxide derivatives according to the invention are completely resistant again water even at temperatures up to 200° C,

Example 2

To a solution of 1160 parts of 3-ethyl-3-methylol trimethylene oxide in 680 parts of absolute benzene there are added 10 parts by volume of a molar solution of boron trifluoride diethyl etherate in absolute benzene with stirring. The temperature of the reaction mixture rises to about 85° C. whereby the solution at first thinly liquid solidifies to a gelatinous clear mass. After cooling to 60° the reaction mixture is allowed to remain at this temperature for 6 days. By adding 500 parts by volume of 0.1 n caustic soda solution the catalyst is rendered inactive and after distilling the benzene the product is freed from inorganic substances by repeated boiling with water and then completely dried under reduced pressure at 150° C. 1120 parts of a water insoluble clear transparent colourless resin are obtained with a softening point of 125° C. The hydroxyl number is 500.

Additions of small amounts of water raise the polymerization speed while larger amounts of water have the opposite effect. If, for example, 1.2 parts of water are added the polymerisation temperature reaches 115° C. and one obtains after only one day at 60° C. practically the same yield. The resin thus obtained is then modified by reaction with ethylene oxide or propylene oxide or both as described in Example 1. The amounts of these alkylene oxides may be varied within wide limits. The properties of the products are similar to those described in Example 1.

Example 3

116 parts of 3-ethyl-3-methylol trimethylene oxide are heated to 100° C. and then combined with 1 part of concentrated sulphuric acid. The temperature is maintained for 24 hours and after working up according to Example 1, 102 parts of a hard, water insoluble resin are obtained with a relative viscosity of 1.07 measured at 25° C. in 0.5% cresol solution.

The resin thus obtained is then modified by reaction with ethylene oxide or propylene oxide or both as described in Example 1. The amounts of these alkylene oxides may be varied within wide limits. The properties of the products are similar to those described in Example 1.

Example 4

116 parts of 3-ethyl-3-methylol trimethylene oxide are heated with stirring for 8 hours at about 150° C. with 10 parts of a sulphonated cross-linked polystyrene in pearl form, usable as a cation exchanger. After removal of the catalyst by filtration of the reaction mixture (which is sufficiently thinly liquid at 150° C.), volatile constituents are removed at the same temperature. 30 parts of a water-insoluble resin are obtained, and 82 parts of un-reacted 3-ethyl-3-methylol trimethylene oxide.

The resin thus obtained is then modified by reaction with ethylene oxide or propylene oxide or both as described in Example 1. The amounts of these alkylene oxides may be varied within wide limits. The properties of the products are similar to those described in Example 1.

Example 5

In a Dry-Ice/methanol-cooled reflux vessel, 116 parts of 3-ethyl-3-methylol trimethylene oxide are mixed with 40 parts by volume of liquid methyl chloride. 1 part by volume of the catalyst used in Example 2 is added with stirring. The polymerisation starts with the boiling of the methyl chloride, and after a few hours the contents of the vessel solidify to a clear transparent mass, which is worked up in the manner of Example 2 to give 104 parts of colourless solid resin with softening point 124° C.

The resin thus obtained is then modified by reaction with ethylene oxide or propylene oxide or both as described in Example 1. The amounts of these alkylene oxides may be varied within wide limits. The properties of the products are similar to those described in Example 1.

Example 6

102 parts of 3-methyl-3-methylol trimethylene oxide are combined with 1 part by volume of the catalyst of Example 2. After polymerisation and working up in the manner of Example 1, one obtains 96 parts of a hard colourless, water-insoluble resin, with a softening point of 106° C.

The resin thus obtained is then modified by reaction with ethylene oxide or propylene oxide or both as described in Example 1. The amounts of these alkylene oxides may be varied within wide limits. The properties of the products are similar to those described in Example 1.

Example 7

11.8 parts of 3,3-dimethylol trimethylene oxide are combined with 0.1 part by volume of the catalyst used in Example 2. By heating to about 100° the polymerisation is initiated, and completed after a short time by heating to 200–220° C. A hard colourless resin is obtained, of softening point at about 230° C.

The resin thus obtained is then modified by reaction with ethylene oxide or propylene oxide or both as described in Example 1. The amounts of these alkylene oxides may be varied within wide limits. The properties of the products are similar to those described in Example 1.

Example 8

290 grams (2.5 mol) of 3-ethyl-3-methylol trimethylene oxide are transferred with 3 grams of sodium into a three necked flask fitted with a stirrer, thermometer, gas inlet tube and outlet tube. After the sodium has been dissolved and the apparatus has been blown through with nitrogen a strong stream of ethylene oxide is led through at 130–135° C. After 5 hours the weight increase is 760 grams corresponding to 6.9 mols ethylene oxide per OH group of the starting material. The product is a yellowish coloured oily liquid. After neutralisation of the sodium catalyst by means of acid it is polymerised as follows without further purification.

800 grams of the trimethylene oxide polyether produced are transferred to a solution of 8.7 grams of boron tri-fluoride etherate in 50 ml. absolute benzene and heated for 8 hours to 80° C. whereupon polymerisation is completed. The reaction product is neutralised with the calculated quantity of soda and represents a light brown viscous paste readily soluble in cold or warm water and in most organic solvents such as chlorobenzene, methylol, acetic ester and chloroform but only difficultly soluble in ligroin.

Example 9

580 grams (5 mols) of 3-ethyl-3-methylol trimethylene oxide are treated in the presence of 3 grams of sodium with ethylene oxide in the manner described in Example 8 to an increase in weight of 475 grams corresponding to 2.18 mols per OH group. The reaction product is an almost colourless liquid. It is neutralised with acetic acid and polymerised as follows:

80 grams (about 0.2 mol) of the product are mixed with 25 grams (about 0.2 mol) of 3-ethyl-3-methylol trimethylene oxide and added to 0.8 gram of boron trifluoride etherate in 5 ml. of benzene at room temperature. The temperature rises for ½ hour to 35° C. and then rapidly within 10 minutes to 95° C. and then slowly falls. The reaction product is heated for a further 4 hours at 80° C. to complete the polymerisation. The boron trifluoride is then neutralised with soda, leaving a water clear colourless very syrupy liquid containing no detectable monomeric product. It is soluble readily in chlorobenzene; much less readily in ligroin, cyclohexane and water.

Example 10

For the preparation of mineral oil emulsion, 5–15 parts of a polymeric trimethylene oxide alcohol with polyether side chains prepared according to any one of the processes described in any one of the examples mentioned above but containing an average of 4 mols of ethylene oxide hydroxyl group, are mixed with 90 parts of the oil to be emulsified and water is then slowly stirred into this mixture. A white stable emulsion is obtained. The preparation and further working up of this emulsion may be carried out at elevated as well as at low temperature.

Example 11

A highly stable white emulsion of 2,2-bis-(p-chlorophenyl)-1,1,1-trichlorethane in water is obtained by diluting with water a homogeneous melt of 50 parts of the said trichlorethane derivative with 50 parts of any one of the polymeric trimethylene oxide alcohols with polyether side chains prepared according to any one of the Examples 1–9 but containing an average of 5.2 mols of ethylene oxide per one hydroxyl group of the starting material.

Example 12

For the preparation of textile dyeings which are uniform in shade and degree of penetration, the dyestuffs in question, e.g. 0.4% of a dimethoxyviolanthrene dyestuff, are used with the addition of a polymeric trimethylene oxide alcohol with polyether side chains prepared by aforesaid process with 6.8 mols of ethylene oxide per hydroxyl group of the starting material. 1.5 to 2 grams of the product are used per litre of the dyebath. The protective colloid and dispersing properties imparted to a solution by the addition of the said polymers have a good levelling effect on the dyestuffs in the dyebaths. The addition of the polyether to the dyebath moreover gives rise to more rapid dissolution of the dyestuffs. With conventional dyeing methods for indanthrene dyestuffs more level dyeings (as to shade and penetration) are obtained than when using previously known levelling and dispersing agents.

Example 13

The polyethers described in Examples 1–9, may also be used as an assistant in the dyeing of textiles with substantive or acid dyestuffs. An excellent levelling effect is attained by the addition of 0.5 to 1.5 grams of the compound per litre of dyeing liquor.

Among the substantive dyestuffs on which a good levelling effect may be obtained according to the invention, there may be mentioned for instance:

Benzodunkelgrün B (compare Farbstofftabelle von Gustav Schultz, Akademische Verlagsgesellschaft m.b.H., Leipzig, 1932, 2. Band, Seite 32),
Siriuslichtgrau VGL (compare Farbstofftabelle, 1939, Ergänzungsband II, Seite 254),
Siriuslichtgrün BB (compare Farbstofftabelle, 1939, Ergänzungsband II, Seite 254).

Among the acid dyestuffs may be mentioned:

Supranolbraun 5 R (compare Farbstofftabelle, 1939, Ergänzungsband II, Seite 265).

Combinations of different dyestuffs also may be used such as:
Indanthrengoldorange 3 G (compare Farbstofftabelle, 1932, 2. Band, Seite 130) with
Indanthrenbrillantgrün 4 G (compare Farbstofftabelle, 1931, 1. Band, Seite 569, No. 1269) or
Indanthrengoldorange 3 G (compare Farbstofftabelle, 1932, 2. Band, Seite 130) with
Indanthrendunkelblau BOA (compare Farbstofftabelle, 1931, 1. Band, Seite 656, No. 1262).

Example 14

For cleaning surface, the polyethers mentioned in Examples 1–9 are expediently applied to a carrier. Crepe paper is impregnated with a solution of 20 grams of the compound in 100 grams of methanol. After evaporation of the solvent, the paper has absorbed about 50% of the polyether. With this paper panes of glass soiled by oil may be cleaned in a very short time since the dirt strongly adheres to the paper which imparts to the glass surface sufficient active substance to render it completely hydrophilic. After a treatment of this kind, a clean surface is obtained on which water droplets are easily dispersed. On a surface thus treated dirt does not adhere strongly and may easily be removed by simply wiping with an untreated paper or other material.

We claim:

1. Polymeric trimethylene oxide derivatives with polyether side chains according to the general formula:

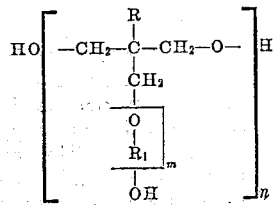

wherein R represents a residue selected from the group consisting of an alkyl radical, the hydroxy methyl group, and the hydroxy ethyl group, $R_1$ a radical selected from the group consisting of the ethylene and the propylene radical, and $m$ a whole number from 3 to 30 and $n$ a whole number from 3 to 10.

2. The process for preparing polymeric trimethylene oxide derivatives with polyether side-chains which comprises contacting a compound of the formula:

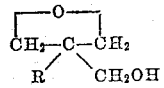

wherein R is selected from the group consisting of alkyl, methylol and ethylol with a catalytic amount of an acid polymerization catalyst, neutralizing the catalyst after polymerization to the desired degree, melting resulting polymer, and heating the resulting polymer with an alkylene oxide selected from the group consisting of ethylene oxide and propylene oxide at a temperature of about 50 to about 250° C.

3. The process for preparing polymeric trimethylene oxide derivatives with polyether side-chains which comprises heating a compound of the formula:

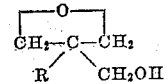

wherein R is selected from the group consisting of alkyl, methylol and ethylol and an alkylene oxide selected from the group consisting of ethylene oxide and propylene oxide at a temperature from about 50 to about 250° C. in the presence of a catalytic amount of a basic catalyst, cooling resulting compound containing polyether side-chains and contacting resulting compound containing polyether side-chains with a catalytic amount of an acid polymerization catalyst until the desired degree of polymerization is obtained.

References Cited in the file of this patent

UNITED STATES PATENTS

| | | |
|---|---|---|
| 1,877,748 | Dove | Sept. 13, 1932 |
| 2,095,221 | Smith | Oct. 5, 1937 |
| 2,333,919 | Flaxman | Nov. 9, 1943 |
| 2,446,045 | De Groote et al. | July 27, 1948 |

(Other references on following page)

UNITED STATES PATENTS

| | | |
|---|---|---|
| 2,558,065 | Tice | June 26, 1951 |
| 2,574,546 | De Groote | Nov. 13, 1951 |
| 2,574,547 | De Groote | Nov. 13, 1951 |
| 2,574,817 | De Groote | Nov. 13, 1951 |
| 2,581,038 | Middendorf | Jan. 1, 1952 |
| 2,602,079 | De Groote et al. | July 1, 1952 |
| 2,617,769 | Nichold et al. | Nov. 11, 1952 |
| 2,648,635 | Brown et al. | Aug. 11, 1953 |
| 2,662,056 | McCarthy et al. | Dec. 8, 1953 |
| 2,674,619 | Lundsted | Apr. 6, 1954 |
| 2,706,181 | Pruitt et al. | Apr. 12, 1955 |
| 2,722,340 | Feild et al. | Nov. 1, 1955 |
| 2,722,492 | Ralston | Nov. 1, 1955 |
| 2,722,493 | Markwood et al. | Nov. 1, 1955 |
| 2,722,520 | Hulse | Nov. 1, 1955 |
| 2,764,575 | Kohler et al. | Sept. 25, 1956 |